United States Patent [19]

Kupka

[11] 4,145,065
[45] Mar. 20, 1979

[54] ROLLER SKATE SCOOTER

[76] Inventor: Rudolph J. Kupka, 9101 Sheridan Ave., Brookfield, Ill. 60513

[21] Appl. No.: 803,134

[22] Filed: Jun. 3, 1977

[51] Int. Cl.² .............................................. B62B 7/04
[52] U.S. Cl. .................................. 280/87.04 R; 188/5
[58] Field of Search ............... 280/87.01, 87.02 R, 280/87.04 R, 87.04 A, 293, 298, 301, 47.26; 188/5

[56] References Cited

U.S. PATENT DOCUMENTS

| | | | |
|---|---|---|---|
| 1,253,768 | 1/1918 | Aman | 280/87.04 R |
| 1,531,710 | 3/1925 | McLaren | 280/87.04 R |
| 2,045,983 | 6/1936 | Ferrigno | 280/87.04 A |
| 2,300,725 | 11/1942 | Cieri | 188/5 |
| 2,319,066 | 5/1943 | Klatt | 280/87.04 R |
| 2,587,790 | 3/1952 | Thalman | 280/301 |
| 2,994,545 | 8/1961 | Gass | 280/87.04 A |
| 3,292,942 | 12/1966 | Mitty | 280/47.26 |
| 3,309,104 | 3/1967 | Gold | 280/87.04 R |
| 3,314,494 | 4/1967 | Weitzer | 280/87.04 R |
| 3,693,998 | 9/1972 | Cummins | 280/87.01 |

*Primary Examiner*—Joseph F. Peters, Jr.
*Assistant Examiner*—R. Schrecengost
*Attorney, Agent, or Firm*—Dressler, Goldsmith, Clement, Gordon & Shore, Ltd.

[57] ABSTRACT

A roller skate type scooter for improved maneuverability and control. The scooter includes an articulated support platform with pivotally connected forward and rearward footboards. At least one wheel is secured to the underside of each footboard and a steering assembly, such as a semi-cylindrical cab, is mounted upon the front footboard for remotely and arcuately maneuvering the first footboard generally in a horizontal plane about a pivot point. The cab has a semi-cylindrical front surface for substantially protecting the rider and for avoiding puncturing other objects and persons during accidental collision. The cab defines a shield which is constructed and arranged to substantially deflect the flow of oncoming air generally around the body of the rider during propulsion of the scooter. In one preferred form, the scooter is equipped with brake and kickstand assemblies.

13 Claims, 12 Drawing Figures

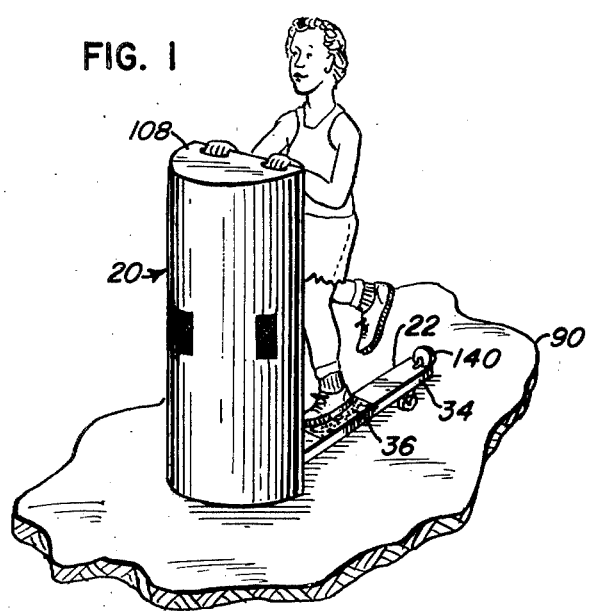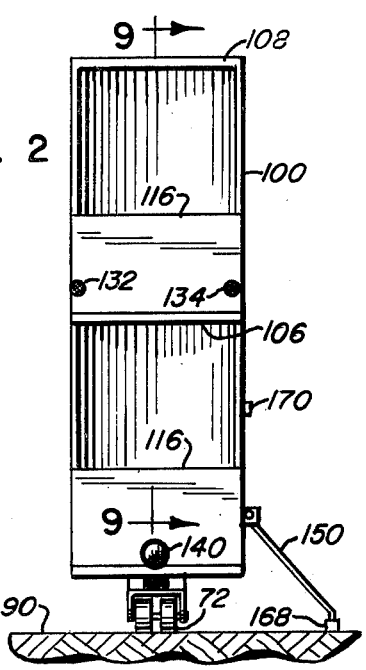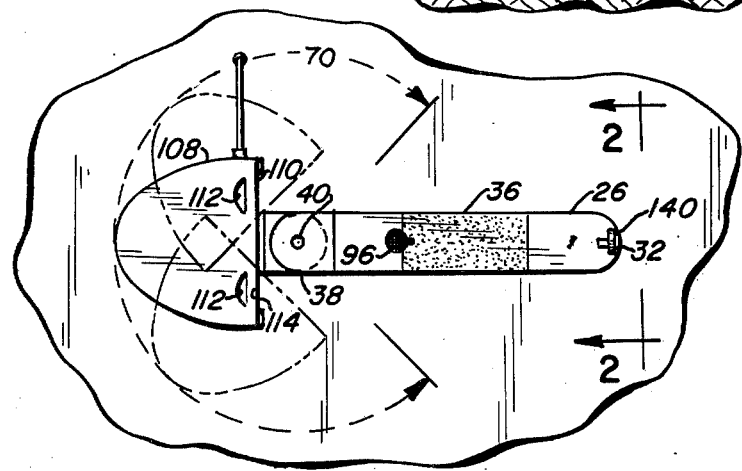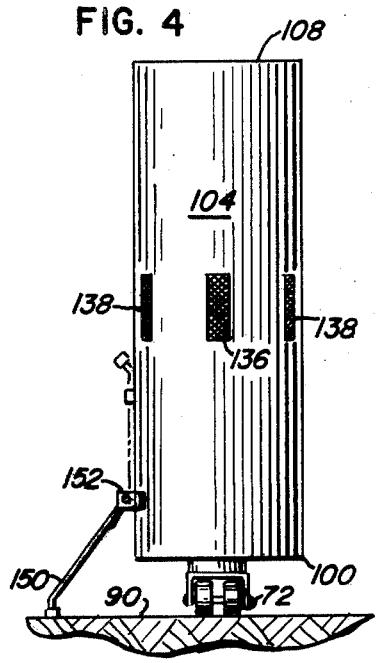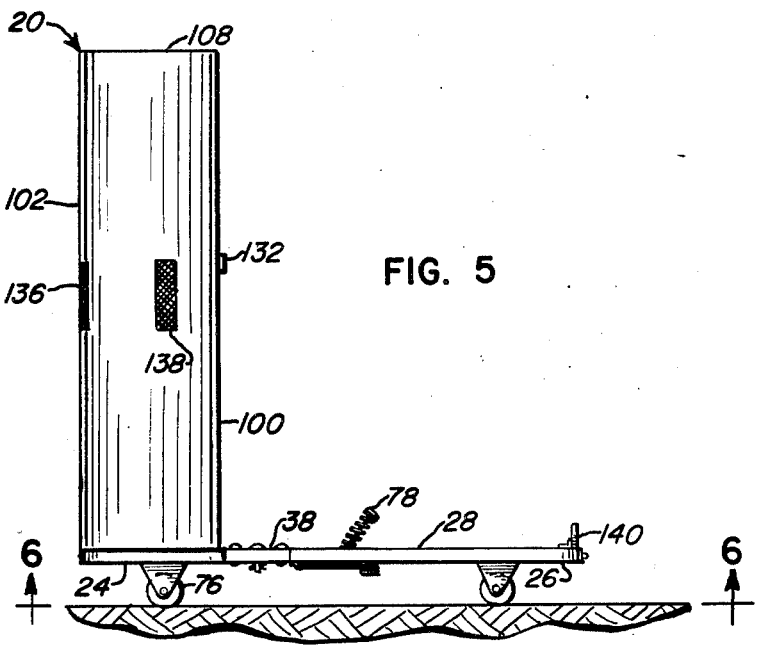

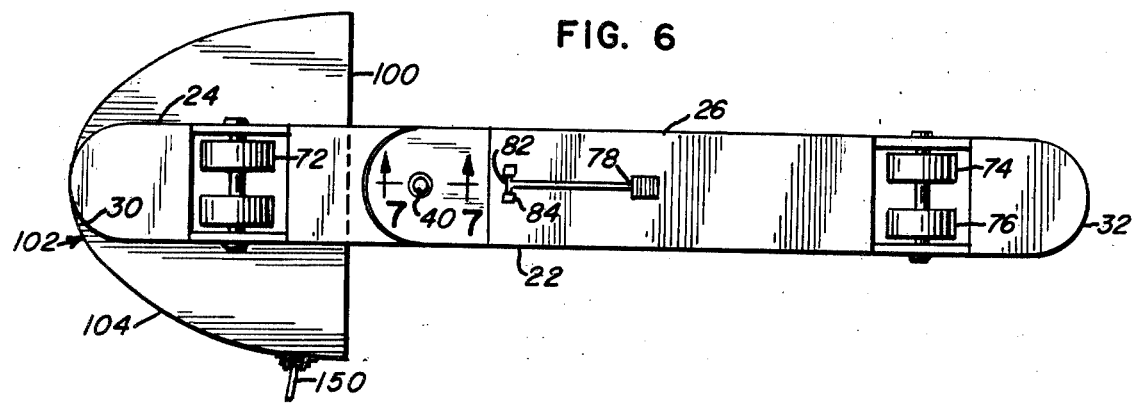
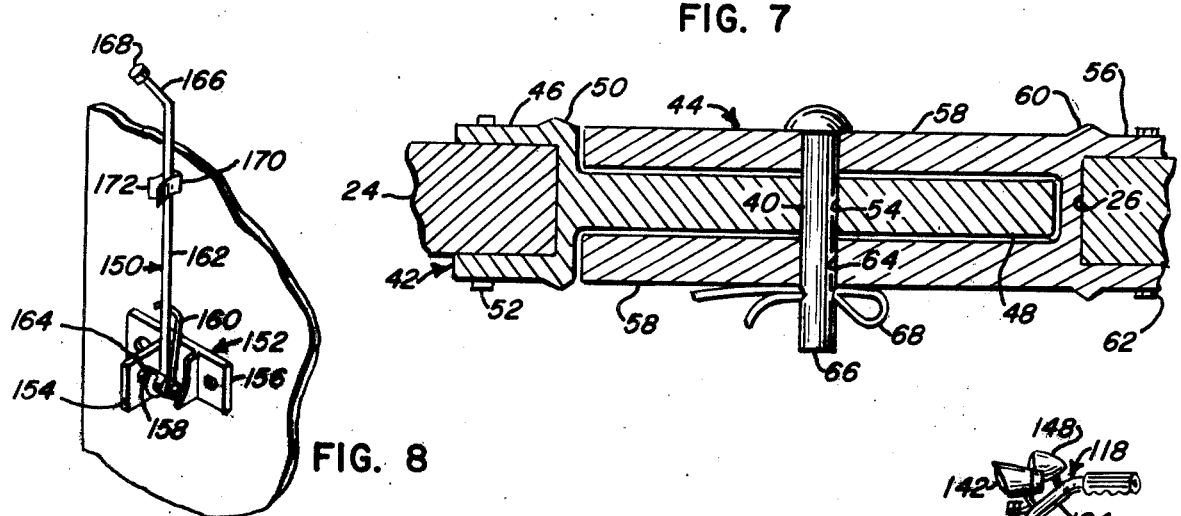
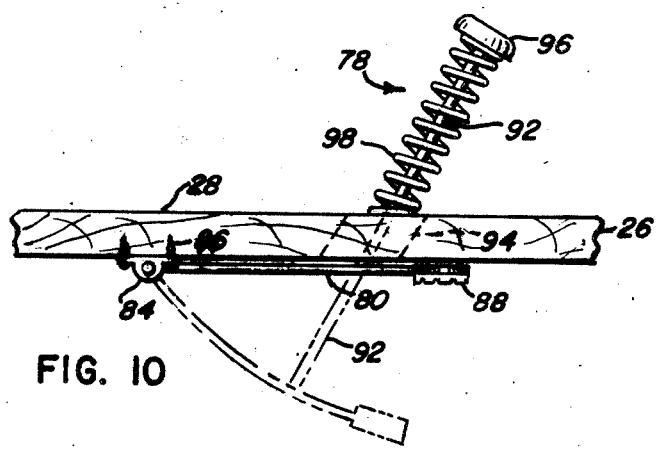
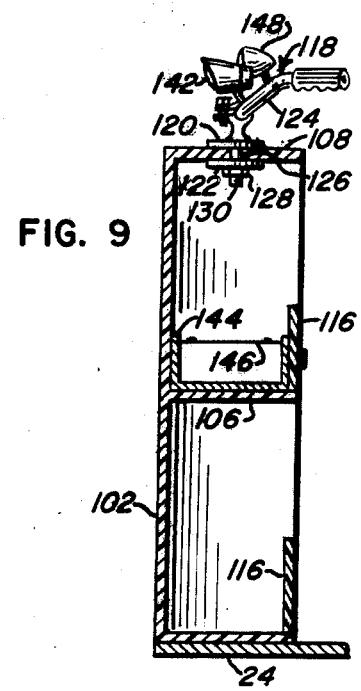

ROLLER SKATE SCOOTER

BACKGROUND OF THE INVENTION

This invention relates to non-motorized vehicles, and more particularly, to roller skate scooters and the like.

For over thirty years homemade scooters have been built with a wooden orange crate or the like mounted upon a wooden plank and roller skate wheels mounted to the underside of the plank. Conventional commercial versions of the homemade scooter have been made from a single metal plank with rubber wheels mounted to the underside of the plank and a single vertical steering rod connected to the front wheel. Such conventional scooters are difficult to maneuver and control, are sometimes unstable and present problems in negotiating curves. It is therefore desirable to construct a stable scooter which is easy to maneuver and control.

SUMMARY OF THE INVENTION

A new and improved foot-propelled scooter is provided for gliding upon a pavement or the like.

The scooter includes an articulated support platform for supporting the weight of a child. The articulated support platform is of a width slightly larger than the width of a child's foot and includes a first elongated front footboard and a second elongated rearward footboard. The rearward footboard is normally positioned in longitudinal alignment with and rearward of the first footboard. Coupling means pivotally connect the first and second footboards generally in an end-to-end array and define a pivot point.

In the preferred embodiment the scooter has a turning radius which extends along an oblique angle about the pivot point.

Wheel means are secured to the underside of the articulated support platform and are spaced from the coupling means. The wheel means include at least one wheel and preferably a first set of wheels in side-by-side relationship secured to the underside of the first footboard and at least one wheel and preferably a second set of wheels in side-by-side relationship secured to the underside of the second footboard.

Steering means operatively connect the first footboard for remotely and arcuately maneuvering the first footboard generally in a horizontal plane about the pivot point.

In one form the scooter includes brake means operatively connected to the second footboard for mechanically stopping the momentum of the scooter. Static stabilizing means preferably in the form of a kickstand are desirably connected to the steering means for substantially statically supporting the scooter in a prone position.

In the illustrative embodiment the steering means includes an upright cab secured to the first footboard. The upright cab has a semi-cylindrical shield-like front facing toward the forward direction for substantially protecting the child and for substantially avoiding puncturing of other objects and persons during accidental collisions. The shield-like front defines a forwardly-facing baffle for substantially deflecting the flow of oncoming air generally around the body of the child during propulsion of the scooter. In one preferred form the cab includes storage means such as a plurality of vertically spaced shelves defining storage compartments and a top generally covering such storage compartments.

In the illustrative embodiment illuminating means are operatively connected to the steering means and include first and second generally red reflectors positioned generally to face rearwardly. The red reflectors are secured to the cab on opposite sides of the articulated support platform so that no more than one of the reflectors will be optionally blocked by the child during propulsion of the scooter. Another red reflector is positioned to face rearwardly on the back end of the rearward footboard so as to define a taillight. Desirably the scooter includes some form of audible signal means mounted upon the steering means for audibly signaling pedestrians.

A more detailed explanation of the invention is provided in the following description and appended claims taken in conjunction with the accompanying drawings.

BRIEF DESCRIPTION OF THE DRAWINGS

FIG. 1 is a perspective view of a foot-propelled roller skate scooter in accordance with principles of the present invention;

FIG. 2 is an enlarged rearward view of the scooter with a kickstand in a downward position;

FIG. 3 is a top plan view of the scooter and illustrating in dotted or phantom lines the turning radius of scooter;

FIG. 4 is a front view of the scooter;

FIG. 5 is a longitudinal side view of the scooter;

FIG. 6 is an enlarged bottom view of the scooter taken substantially along line 6—6 of FIG. 5;

FIG. 7 is a greatly enlarged view of the coupling assembly of the present invention taken substantially along line 7—7 of FIG. 6;

FIG. 8 is a perspective view of the kickstand of the present invention shown in an upward position;

FIG. 9 is a fragmentary and longitudinal cross-sectional view of the scooter taken substantially along line 9—9 of FIG. 2 and illustrating the scooter equipped with an optional handle bar assembly and headlight;

FIG. 10 illustrates in solid line the foot brake assembly of the present invention in an upward non-activated position and depicts in dotted or phantom lines the foot brake assembly as actuated in a downward position.

DETAILED DESCRIPTION OF THE ILLUSTRATIVE EMBODIMENT

Figure 11:
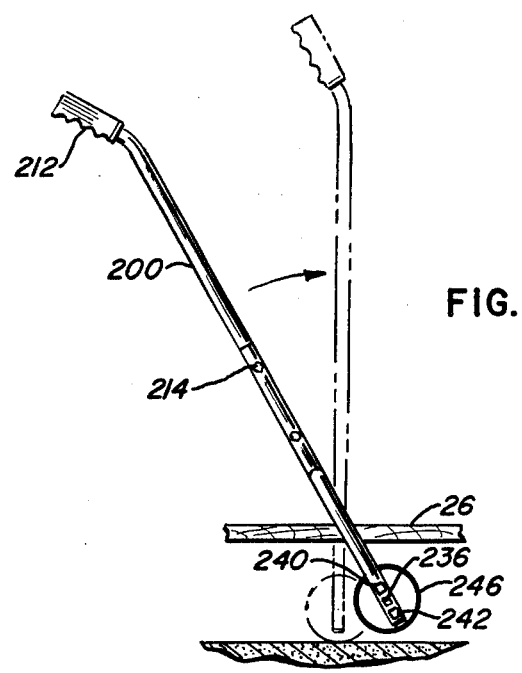
FIG. 11 illustrates in solid line the hand brake assembly of the present invention in a non-activated position and depicts in dotted or phantom lines the hand brake assembly as actuated.

Referring to the drawings a non-motorized foot-propelled roller skate scooter 20 is provided for gliding upon a pavement or the like. The scooter can freely glide downhill by either foot propulsion or simply by the action of gravitational forces acting upon the combined weight of the scooter and the child who is operating and riding the scooter.

The scooter 20 includes an articulated support platform 22 which supports the weight of a child. Preferably the articulated support platform is of a width slightly larger than the width of a child's foot, although in some situations it may be desirable that the width of the articulated support platform 22 be slightly greater than the width of a child's two feet in side-by-side relationship. The articulated support platform 22 includes a first elongated front footboard 24 or forward running board and a second elongated rearward footboard 26 or rearward running board. The rearward footboard 26 is normally positioned in longitudinal alignment with and rearward of the forward footboard 24. Each of the footboards has a top surface 28 which is generally planar or flat.

The footboards 24 and 26 are preferably made of plywood, such as ¾ inch plywood, and is of sufficient strength to support the weight of different sized children who may use the scooter 20. Plywood is one type of preferable material because it is rigid enough so as not to buckle, yet is sufficiently flexible enough so as to permit temporary bending or flexing in response to various loads and weights of children. The footboards 24 and 26 should be sufficiently heavy to provide a relatively low center of gravity of the scooter 20 to enhance stability and maneuverability. When desired, other materials such as plastic or metal can be used in fabricating the footboards.

The front footboard 24 has a rounded front end 30 and the rearward footboard has a rounded rear end 32. Chrome strips 34 are preferably attached to the sides of the footboards to prevent the plywood from splintering and to provide asthetic appeal. In one form the rearwood footboard was approximately 24 inches, and was of a sufficient size so that a child could place his foot anywhere along the footboard without substantially affecting the operation and maneuverability of the scooter.

The rearwardly footboard 26 includes a non-skid portion 36 preferably comprising a non-skid sand paint. Under some circumstances, it may be desirably to use paste-one non-skid strips rather than non-skid paint. The footboards 24 and 26 are preferably shellacked before the non-skid portion is applied for ease of cleanliness and to provide a better appearance. When a plastic footboard footboard is desired, grooves are preferably molded in the rearward footboard thereby eliminating the need for non-skid paint or strips.

Coupling means 38 are provided for pivotally connecting the first or front footboard 24 and the second or rearward footboards 26 together generally in an end-to-end array. The coupling means generally define a pivot point 40 and include a pair of mating die-cast turning plates, preferably of steel or iron, including a first or forward turning plate 42 which slidably and matingly engages a second or rearward turning plate 44. In use the turning plates 42 and 44 are greased or otherwise lubricated to reduce wear.

The forward turning plate 42 has a rectangular and tubular or hollow front head 46 for snugly receiving the rearward end of the front footboard 24. An elongated solid tongue 48 extends generally horizontally and rearwardly from the middle of the front head 46 as shown in FIG. 7. The top surface of the forward turning plate has triangular protuberances 50 extending upwardly for rigidifying and strengthening the turning plate 42. The triangular protuberances 50 are spaced from each other and enhance resistance to wear so as to prolong the useful life of the turning plate 42. The front head 46 is secured to the front footward 24 by fastening means such as bolts 52, although other means such as a suitable adhesive or press-fitting can be employed when desired. The tongue is rectangular is cross-section and is preferably cast to provide a centrally-located hole or aperture 54.

The rearward turning plate 44 is generally U-shaped in cross-section and has a rectangular and rearwardly facing tubular or hollow head 56 for snugly receiving the front end of the rearward footboard 26. A pair of elongated solid arms 58 defining a bifurcated slide plate extend horizontally and forwardly of the rearward head 56. The top surface of the rearward turning plate 44 has protuberances 60 which are similar in shape and function to the triangular protuberances 50 of the forward turning plate 42. Bolts 62 or other fastening means are employed to secure the rearward head 56 to the rearward footboard. The arms 58 are spaced in parallel relationship to each other and sufficiently apart to slidably receive the tongue 48 of the forward turning plate 42 so as to longitudinally surround and envelop the tongue 48. The arms 58 are cast with holes or apertures 64 which are generally in registration with the aperture 54 of the tongue 48 to slidably receive a coupling pin 66. In the preferred form the coupling pin 66 is apertured at its lower end to receive a cotter pin 68 which serves to prevent accidental loss of said coupling pin 66. The cotter pin 68 generably defines the pivot point 40 of the scooter 20. In the illustrative embodiment the front footboard has a turning radius which extends along an oblique angle 70 of about 300 degrees about such pivot point as best shown in FIG. 3.

Wheel means such as front and rearward skate trucks 72 and 74 are bolted or otherwise secured to the underside of the articulated support platform 22. The wheel means are spaced from the coupling means 38 so that each of the wheels 76 is necessarily spaced from the pivot point 40. Such positioning provides a larger turning radius for the scooter 20 and generally increases the stability and maneuverability of the scooter 20. The wheel means include at least one wheel and preferably a first set of wheels 72 in side-by-side relationship secured to the underside of the first forward footboard and at least one wheel and preferably a second set of wheels 74 in side-by-side relationship secured to the underside of the second footboard 26. In the illustrative embodiment each set of wheels takes the form of a straight line roller skate truck comprising a pair of non-driven coaster wheels 76 or casters, made of neoprene or synthetic rubber. Other materials can be used. Each set of wheels are connected to each other by a rigid metal axle capable of withstanding heavy shocks and impact loads.

In one form the front truck 72 was located approximately six inches from the front end 30 of the front footboard and the rearward truck 74 was located approximately six inches from the rear end 32 of the rearward footboard 26. Placement of the wheel in such a manner assists in reducing the impact forces acting upon the die-cast turning plates 42 and 44 thereby increasing the useful life of said turning plates.

In order to enhance the control of the scooter 20, brake means are operatively connected to the second or rearward footboard 26 for mechanically stopping the momentum of the scooter. In the illustrative embodiment the brake means are in the form of a foot brake assembly 78 having a flexible metal plate or rod 80 with a T-shaped forward end 82 pivotally connected to annular metal bracket members 84 as best shown in FIGS. 6 and 8. The bracket members 84 are secured to the underside of the rearward footboard 26 by means of screws 86 or other fasteners. The length of the flexible metal plate 80 is of a length greater than the maximum height of the wheels 76.

Affixed to the rearward end of the metal plate 80 is an elastomeric member 88, such as a piece of rubber tire, which provides a contact surface having a relatively highly coefficient of friction for frictionally engaging the pavement 90 during braking. A substantially rigid and preferably straight rod 92 or bar extends upwardly from the flexible plate 80 to a height above the rearward footboard 26. The rod 92 is freely and reciprocally slidable in a hole or aperture 94 which is drilled through the rearward footboard 26. Preferably the diameter of this hole or aperture 94 is less than the maximum horizontal dimension of the elastomeric member 88. The rigid bar 92 has a stationary button-like foot pedal 96 fixedly secured to its top end at a position above the rearward footboard 26. Preferably the rigid rod 92 is inclined at about a 45 degree angle relative to the rearward footboard 26 with the pedal 96 located rearwardly of the flexible plate 80 and facing the driver so that the driver can place his toe on the pedal 96 when actuating the brake 78.

First spring means, such as a compression or coil spring 98 is positioned around the rigid rod 92 between the foot pedal 96 and top surface 28 of the rearward footboard 26 for normally urging the metal plate 80 generally against the underside of the rearward footboard 26. When the foot pedal 96 is actuated or depressed to a downward position by the top of the child's (driver's) foot, the flexible metal plate 80 will swing downward so as to arc or bow downward generally in the forward direction of the scooter 20 as best shown in dotted line or phantom in FIG. 10 so that the contact surface of the elastomeric member 88 will frictionally engage the pavement 90. The bending or arcing of the metal plate 80 increases the surface area of contact of the elastomeric member 88 and thereby increases the braking power of the scooter 20.

The components of the scooter 20 also includes steering means operatively connected to the first or front footboard 24 for remotely and arcuately maneuvering the first footboard 24 generally in a horizontal plane about the pivot point 40. In the illustrative embodiment the steering means takes the form of an upright cab 100 which is mounted upon and supported by the first or front footboard 24 and is spaced from the forward turning plate 42. In one form, the cab 100 had a horizontal length of about nine inches which was spaced approximately three inches from the pivot point 40, the forward footboard 24 had a length of about twelve inches and a width and thickness approximating the rearward footboard 26.

The cab 100 is desirably of a height less than the height of the child so as not to impair the child's vision and has a semicylindrical shield-like front 102 facing in the forward direction for substantially protecting the child and for substantially preventing puncturing of other objects and persons during accidental collisions. The curved wall of the cab 100 has a curvature similar to a half of an oil drum. In one form such wall was ¼ inch thick. The curvature of the cab 100 assists in minimizing wind resistance. The front 102 of cab 100 is rigid and strong, but yet is slightly flexible, to resist small impact forces and collision. A suitably contoured or curved windshield can be utilized when desired. The shield-like front 102 generally defines a forwardly facing baffle 104 for substantially deflecting the flow of oncoming air generally around the body of the child during propulsion of the scooter 20. Preferably the cab 100 is made of molded plastic so as to be essentially maintenance free. The choice of plastic is believed to have selling apeal and can be provided in a variety of colors.

In the preferred embodiment the cab 100 is provided with storage means including a plurality of vertically spaced planar or flat horizontal shelves 106 which rigidify the semi-cylindrical wall of the cab 100 and defines storage compartments and a top 108 generally covering such storage compartments. The top 108 generally takes the form of an arcuate semicircular support member having a rearward edge 110 and is fabricated with two laterally spaced apertures or hand holds 112 for comfortably receiving the hands of a child. The child can hold the manually-grippable surfaces 114 positioned between and adjacent the rearward edge 110 of the arcuate top 108 and the apertures 112. The apertures or hand holds 112 in the top 108 are preferably half-moon or crescent shaped so that the child can easily grasp the top 108 of cab 100. The apertures or hand holds 112 make the cab 100 easy to maneuver enhancing the stability of the scooter 20. The rearward manually-grippable surface or portion 114 of the hand holds 112 are preferably flat to minimize manufacturing costs.

The shelves 106 are accessible from the rear so as to accommodate and carry wrenches, rags, school books, toys and other articles. Each of the shelves is provided with a rearward upright abutment plate 116 to prevent the objects carried on the shelves 106 from falling off during acceleration and deacceleration. In one form the shelves 106 and top 108 were ¾ inch thick.

In the illustrative embodiment, the scooter 20 is equipped with a handle bar assembly 118 including an upper plate 120 secured against the top 108 of the cab 100 and a lower plate 122 secured against the underside of such top 108. The upper and lower plates 120 and 122 are clamped against and reinforce the top 108 of the cab 100 so as to prevent the top 108 of the cab 100 from being torn or otherwise deformed from the torque of the handle bars 124 during turning. The upper and lower plates 120 and 122 are suitably apertured to pivotally and rotatably receive the downwardly extending axle 126 of the handle bars 124. Desirably the handle bars 124 are positioned at a location where the child or operator feels it is most comfortable. The clamping of the upper and lower plates 120 and 122 against the top 108 of the cab 100 may be accomplished by tightening a nut 128 against the threaded stud 130 at the bottommost end portion of the downwardly extending axle 126 of the handle bars 124.

Preferably, the scooter 20 illuminating means operatively connected to the steering means. The illuminating means include first and second generally red reflectors 132 and 134, respectively, or taillights which are mounted to the upright plates 116 of the shelves 106 or against the rearwardly facing vertical edges of the cab 100 and are positioned to face rearwardly on opposite sides of the articulated support platform 22 so that no more than one of the reflectors 132 or 134 will be optically blocked by the child during propulsion of the scooter 20. A third red reflector or rearward taillight 140 may also be fastened to the back end of the rearward footboard as shown in FIGS. 1, 2, 3 and 5. Preferably at least one white reflector 136 is mounted and centered on the front 102 or baffle portion 104 of the cab 100 and a pair of yellow reflectors 138 are transversely positioned on each side of the cab 100 as best illustrated in FIG. 1.

Additional safety features desirably include a battery-operated illuminating lamp, such as a headlight 142. In the illustrative embodiment, a plastic battery box 144 securely seated upon the intermediate shelf houses the battery 146 which is connected to the headlight 142. Audible signal means, such as a battery-operated horn 148, can be connected to the steering means such as by mounting on the top 108 of the cab 100. The battery 146 on the intermediate shelf can also be connected to the horn 148.

In order to enhance the stability of the scooter when the scooter is not being propelled, the scooter desirably includes static stabilizing means such as a kickstand 150 operatively coupled to the steering means for substantially statically supporting the scooter 20 in a prone position. In the illustrative embodiment the kickstand 150 includes a π shaped bracket 152 having a pair of outwardly-extending parallel legs 154 which extend from a base 156 that is mounted, such as by adhesive or fasteners, to the exterior of the cab 100 as best shown in FIG. 6. The legs 154 of the bracket securely hold a dowel pin 158 about which is coupled second spring means 160, such as semi-rigid hair-spring.

The kickstand also has an elongated rod 162 with one end 164 curved to form a loop which pivotally circumscribes the dowel pin 158 so as to be pivotable with respect to the steering means. The opposite and remote end 166 of the rod 162 is bent to extend outwardly from the cab 100 and has an enlarged end surface or head 168 for frictionally engaging the pavement 90 when the scooter 20 is at rest. Clip means, such as a clothespin nose-type shaped metal clip 170 are mounted above the bracket 152 as best shown in FIG. 8 for releasably clamping the elongated rod 162 in a generally upright position in order to position and space the end surface or head 168 above the pavement 90 when the scooter 20 is being or is ready to be propelled. When the rod 162 is kicked or otherwise moved away from the jaws 172 of the clip 170, the spring 160 normally urges the end surface 168 of the rod 162 against the pavement 90 so that the rod 162 is positioned at an incline such as a 45 degree angle relative to the cab 100 and pavement 90 as shown in FIG. 4.

Figure 12:
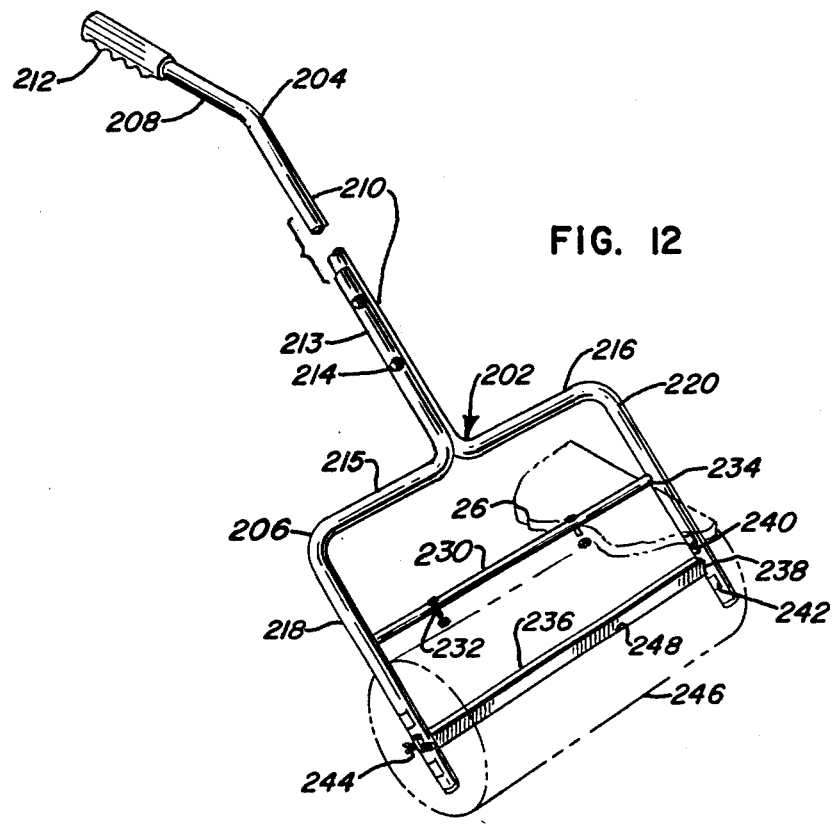
FIG. 12 is a fragmentary perspective view of the hand brake assembly.

The scooter 20 can also be equipped with a hand brake assembly 200 as shown in FIGS. 11 and 12 in lieu of the foot brake assembly 78 depicted in FIGS. 5 and 10 for mechanically stopping the momentum of the scooter. The hand brake assembly 200 is desirably mounted to the rearward running board 26, in proximity to the rearward turning plate 44. The hand brake assembly 200 includes a pivotable frame 202 or yoke which is preferably formed of metal pipes or tubing.

The pivotable frame 202 has an upper arm portion 204 that extends upwardly and a lower inverted U-shaped portion 206 that extends below the upper arm portion 204. The upper arm portion 204 includes an inclined handle section 208 which is bent toward the cab 100 and an elongated generally straight forearm section 210 that extends downwardly from the handle section 208. A rubber finger grip or handle 212 fits snugly around the top end of the handle section 208. As best shown in FIG. 12, an auxiliary forearm section 213, which is shorter than the elongated forearm section 210, is flattened and arcuately shaped to matingly engage and confront the elongated forearm section 210. The forearm sections 210 and 213 have aligned apertures for receiving fasteners, such as bolts 214, which secure the two forearm sections 210 and 213 together.

The inverted U-shaped portion 206 has horizontally aligned sections 215 and 216 integrally connected to the auxiliary and elongated forearm sections 213 and 210, respectively. The horizontally aligned sections 215 and 216 together span across the width of the rearward footboard 26. Extending downwardly from each of the horizontal sections 215 and 216 are legs 218 and 220, respectively, which are positioned slightly outward and adjacent the elongated sides of the rearward footboard 26.

A horizontal cylindrical rod 230 extends between and connects the legs 215 and 216 and is bolted to the top surface 28 of the rearward footboard 26, preferably near the turning plate, by means of bolts 232 or other fasteners. The ends of the horizontal rod 230 extend into circular slots 234 of legs 218 and 220. In the illustrative embodiment only the inward portion of each leg has a slot 234, i.e., the slots 234 do not extend entirely through the legs. The slots 234, however, are slightly larger than the cross-section of the horizontal rod 230 so that the legs 218 and 220 will pivot about horizontal rod 230. This particular arrangement and construction pivotally connects the frame 202 to the horizontal rod 234 and the rearward footboard 26 with each end of the horizontal rod 234 generally defining a pivot point. It may be desirable, however, in some situations that the slots extend entirely through both the inner and outer portions of the legs and that the horizontal rod extends through the slots and past the legs with each end of the horizontal rod capped or secured by a cotter pin or other fastener.

Beneath the bottom of the rearward footboard 26 is a square rod 236 which extends across the width of the rearward footboard 26. The ends of the square rod matingly engage aligned square holes 238 extending entirely through the lower portion of the legs 218 and 220. The square holes are horizontally aligned so that the square rod is positioned horizontally and in generally parallel relationship with the rearward footboard 26. Preferably additional square holes 240 and 242 are formed in the legs so that the square rod 236 may be lowered or raised. Cotter pins 244 or other fasteners are used to fixedly attach the square rod 236 to the legs 218 and 220.

An elongated non-rotatable cylindrical roller 246 is mounted and securely fixed to the square rod 236. In the illustrative embodiment the cylindrical roller 246 is made out of a material having a relatively high coefficient of friction, such as hard synthetic rubber, and has a centrally disposed axial square hole 248 throughout its length. Preferably, the roller 246 is molded or fixedly bonded to the square rod 236 so that the roller 246 does not rotate.

As best shown in solid line in FIG. 11 the forearm sections 210 and 213 of the frame 202 normally tilts or slopes towards the cab 100 when the hand brake 200 is not being actuated. This tilting or sloping is generally attributable to the greater weight or mass of the frame 202 which is positioned above the pivot points (above the rearward footboard 26) in comparison to that portion of the frame 202 which is located below the pivot points (generally below the rearward footboard 26). Additional biasing means such as a compression spring can connect the forearms section 212 or 213 to the rearward footboard 26 to urge the forearm sections 212 and 213 toward the cab 100.

When the hand brake 200 is not being actuated the roller 246 is positioned slightly above the pavement or sidewalk and rearwardly of the pivot point as best shown in solid line in FIG. 11.

When it is desired to stop the scooter, the handle section 208 of the hand brake assembly 200 should be pulled rearwardly until the forearm sections 210 and 213 and the legs 218 and 220 are pivoted to a generally vertical position as best shown in phantom in FIG. 11 with the roller 246 frictionally engaging the sidewalk. It is important that the bottoms of the legs 216 and 218 do not extend below the roller 246, so that only the roller 246 and not the legs 218 and 220 engage the pavement when the brake is actuated.

The forearm sections 210 and 213 are of a sufficient length so that the handle or grip 212 when pulled rearwardly is positioned between the waist and shoulders of the child depending upon the particular preference of the user or manufacturer. When it is no longer necessary to apply the brake 200, the handle section 208 can be released whereupon the forearm sections 210 and 213 will move toward the cab 100 and rest in a non-actuating tilting position as depicted in solid line in FIG. 11.

Because the roller 246 does not rotate when it engages the pavement or sidewalk, roller 246 may experience greater wear on one portion of its surface than other portions of its surface. In order to provide for uniform wear of the roller 246, the square rod 236 and roller 246 should be rotated 90° each time excessive or detrimental wear is observed. When the surface of the roller has been uniformly worn, the square rod 236 should be lowered to fit into the additional square holes 242 so that the surface of the roller will be lowered to make better contact with the pavement. In the illustrative embodiment, three sets of square holes 238, 240 and 242 are shown with the upper square holes 240 provided for use with an unworn or new roller 236. In the illustrative embodiment the square rod is shown in the middle holes 238. Additional square holes can be provided.

The components of the scooter 20 can be shipped or packaged in kit form for customers to assemble at home. When desired, the scooter 20 can be preassembled so that it is sold in an assembled form.

The operation of the scooter 20 of the present invention is easy and simple. When a child stands upon the non-skid portion 36 of the scooter 20 upon an incline, such as a hill or sloped driveway, the scooter 20 will smoothly coast or glide downhill solely by the forces of gravity. Additional momentum can be achieved when the child repeatedly pushes his free foot against the incline. The child will use the handle bars 124 or hand holds 112 to turn the cab and the front footboard 24 to easily and safely negotiate curves. The scooter 20 can be stopped at will by use of the foot brake assembly 78 or the hand brake assembly 200. When the scooter 20 is on relatively flat land or pavement, the child will put one foot on the non-skid portion 36 of the rearward footboard 26 and use the other leg and foot to push and propel the scooter forwardly, letting the scooter 20 glide when the scooter has sufficient momentum. When the scooter 20 is not being propelled, the cab 100 can be kept off the grounds by moving the rod 162 of the kickstand 150 to the downward position as best shown in FIGS. 2 and 4.

Although embodiments of this invention have been shown and described, it is to be understood that various modifications and substitutions can be made by those skilled in the art without departing from the novel spirit and scope of this invention.

What is desired to be protected by Letters Patent of the United States is:

1. A foot-propelled scooter, comprising:

an articulated support platform for supporting the weight of a child, said articulated support platform being of a width slightly larger than the width of a child's foot and including a first elongated front footboard having a rearward end and a second elongated rearward footboard having a front end and normally positioned in longitudinal alignment with and rearward of said front footboard, and coupling means pivotally connecting said front and rearward footboards generally in an end-to-end array and defining a pivot point;

said coupling means including a forward turning plate and a rearward turning plate positioned in generally horizontal alignment with each other and pivotally connected to each other, said forward turning plate having a hollow front head spaced forwardly of said rearward turning plate for snugly receiving the rearward end of said front footboard and said rearward turning plate having a hollow rearward head spaced rearward of said hollow front head for snugly receiving the front end of said rearward footboard, one of said turning plates being generally U-shaped in cross-section as viewed longitudinally and having a bifurcated slide plate extending between and positioned in general horizontal alignment with said forward and rearward hollow heads, said bifurcated slide plate having a pair of generally horizontal arms, the other of said turning plates having a general horizontal tongue slidably positioned between said arms and extending between said forward and rearward hollow heads, said tongue being positioned in general horizontal alignment with said rearward footboard and said forward footboard, and coupling pin means spaced between the forward and rearward footboards for pivotally connecting said arms to said tongue, said coupling pin means extending below the level of said rearward footboard and defining said pivot point;

wheel means secured to the underside of said articulated support platform and spaced from said coupling means, said wheel means including at least one wheel secured to the underside of said front footboard and at least one wheel secured to the underside of said rearward footboard; and steering means operatively connected to said front footboard for remotely and arcuately maneuvering said front footboard generally in a horizontal plane about said pivot point, said steering means including a generally upright cab having storage means, said storage means including a plurality of vertically spaced shelves defining storage compartments for carrying objects and a top generally covering said storage compartments, each of said shelves having a rearward upright abutment plate for preventing the objects carried on said shelves from falling off during acceleration and deceleration of said scooter; and illuminating means including first and second generally red reflectors secured to one of said rearward upright abutment plates on opposite sides of said articulated support platform, said red reflectors facing generally rearwardly and being positioned at a location in which no more than one of said red reflectors is optically blocked by the child during propulsion of said scooter, at least one white reflector secured to the front of said cab and facing generally forward, a battery-powered illuminating lamp secured to and positioned above the top of said cab, and at least one battery connected to said illuminating lamp and seated on one of said storage compartments adjacent one of said rearward upright abutment plates.

2. A foot-propelled scooter in accordance with claim 1 including a foot brake assembly comprising:
a flexible metal plate pivotally hinged to the underside of the second footboard and being movable from an upward position, generally parallel to said second footboard, to a downward braking position generally spaced below said second footboard, said flexible metal plate being of a length greater than the maximum height of said wheel means and having an arcuate configuration bowing generally downwardly in said downward braking position;
an elastomeric member secured to the end of said flexible metal plate and having a contact surface with a relatively high coefficient of friction for frictionally engaging the pavement in response to bowing of said flexible plate during braking;
a substantially rigid rod extending upward at an acute angle from said flexible plate to a height above said second footboard and being of a length greater than the height of said wheel means;
said second footboard defining an aperture for slidably receiving said rigid rod;
a stationary button-like foot pedal fixedly secured to the top of said rigid rod at a position above said second footboard; and
first spring means operatively coupled to said rigid rod and extending above said second footboard for normally urging said flexible metal plate to said upward position substantially adjacent the underside of said second footboard.

3. A foot-propelled scooter in accordance with claim 1 wherein said steering means includes a generally upright cab, and said scooter includes a kickstand positioned adjacent said cab and connected to said cab at a location above said platform for substantially statically supporting said scooter in a substantially vertical and prone position.

4. A foot-propelled scooter in accordance with claim 3 wherein said kickstand comprises:
bracket means secured to and extending outward from said cab at a location above said platform, said bracket means including a dowel pin spaced outward from said cab;
an elongated rod pivotally connected to said dowel pin and having an end surface for frictionally engaging the pavement when said scooter is at rest;
spring means normally urging said end surface against said pavement; and
clip means secured to said cab for releasably clamping said elongated rod in a generally upright position adjacent said cab for to position and space said end surface above said pavement when said scooter is ready to be propelled.

5. A foot-propelled scooter in accordance with claim 1 wherein said steering means includes a generally upright cab, and said scooter includes a hand brake assembly, comprising:
a pivotable frame having at least one upwardly extending forearm section and an inclined handle section extending generally towards said cab, said pivotable frame including a pair of legs extending downwardly from and substantially aligned with said forearm section;
means pivotally connecting said legs to said rearward footboard;
a substantially non-rotatable cylindrical roller secured to and extending between said legs and disposed beneath said rearward footboard, said non-rotatable cylindrical roller having a generally smooth outer surface and being of a rubber-like material having a relatively high coefficient of friction for frictionally engaging the pavement during braking, and
means fixedly securing said cylindrical roller to said legs for substantially preventing said cylindrical roller from rotating.

6. A foot-propelled scooter in accordance with claim 1 wherein said top comprises a generally horizontal arcuate support member having a rearward edge, said horizontal support member defining at least two laterally spaced crescent shaped hand holds for receiving both hands of said child and having manually-grippable surfaces disposed between and cooperating with said rearward edge and said hand holds for steering said scooter.

7. A foot-propelled scooter in accordance with claim 1 wherein said steering means further includes handle bars spaced above the top of said cab, said handle bars being inclined generally upward and rearwardly, an axle extending downwardly from said handle bar to a position below the top of said cab, said top defining an aperture for receiving said axle and said steering means including plate means for clamping said axle to said top and for reinforcing said top to substantially prevent the top from being deformed from torque exerted by said handle bars during turning.

8. A foot-propelled scooter in accordance with claim 7 further including audible signal means positioned above said cab and connected to said handle bars, and power source means seated on one of said shelves adjacent one of said rearward upright abutment plate for energizing said audible signal means.

9. A foot-propelled scooter in accordance with claim 1 wherein said wheel means includes:
a first set of wheels in side-by-side relationship and secured to the underside of said first footboard, and
a second set of wheels in side-by-side relationship and secured to the underside of said second footboard.

10. A foot-propelled scooter in accordance with claim 1 wherein said first footboard has a turning radius which extends along an oblique angle about said pivot point for about 300 degrees.

11. A foot-propelled scooter, comprising:
an articulated support platofrm for supporting the weight of a child, said articulated support platform being of a width slightly larger than the width of a child's foot and including a first elongated front footboard having a rearward end and a second elongated rearward footboard having a front end and normally positioned in longitudinal alignment with and rearward of said front footboard, and coupling means pivotally connecting said front and rearward footboards generally in an end-to-end array and defining a pivot point, said front footboard having a turning radius which extends along an oblique angle about said pivot point;
said coupling means including a forward turning plate and a rearward turning plate positioned in generally horizontal alignment with each other and pivotally connected to each other, said forward turning plate having a hollow front head spaced forwardly of said rearward turning plate for snugly receiving the rearward end of said front footboard and said rearward turning plate having a hollow rearward head spaced rearward of said hollow front head for snugly receiving the front end of said rearward footboard, one of said turning plates being generally U-shaped in cross-section as viewed longitudinally and having a bifurcated slide plate extending between and positioned in general horizontal alignment with said forward and rearward hollow heads, said bifurcated slide plate having a pair of generally horizontal arms, the other of said turning plates having a general horizontal tongue slidably positioned between said arms and extending between said forward and rearward hollow heads, said tongue being positioned in general horizontal alignment with said rearward footboard and said forward footboard, and coupling pin means spaced between the forward and rearward footboards for pivotally connecting said arms to said tongue, said coupling pin means extending below the level of said rearward footboard and defining said pivot point;

wheel means secured to the underside of said articulated support platform and spaced from said coupling means, said wheel means including a first set of wheels in side-by-side relationship and secured to the underside of said front footboard and a second set of wheels in side-by-side relationship secured to the underside of said rearward footboard;

brake means operatively connected to said rearward footboard for mechanically stopping the momentum of said scooter;

steering means operatively connected to said first footboard for remotely and arcuately maneuvering said front footboard generally in a horizontal plane about said pivot point, said steering means including a generally upright cab secured to said first footboard, said cab having a semicylindrical shield-like front facing in the forward direction for substantially protecting said child and for substantially preventing puncturing of other objects and persons during accidental collisions, said shield-like front defining a forwardly facing baffle for substantially deflecting the flow of oncoming air generally around the body of said child during propulsion of said scooter, said cab having a plurality of vertically spaced shelves defining storage compartments for carrying objects and a generally horizontal top generally covering said storage compartments, each of said shelves having a rearward upright abutment plate for preventing the objects carried on said shelves from falling off during acceleration and deceleration of said scooter, said top being generally semicircular in shape and having a rearward edge and defining at least two laterally spaced crescent shaped hand holds for receiving both hands of said child for steering said scooter;

a kickstand positioned adjacent said cab and connected to said cab at a location generally above said platform for supporting said scooter in a generally vertical position; and illuminating means including first and second generally red reflectors secured to one of said rearward upright abutment plates on opposite sides of said articulated support platform, said red reflectors facing generally rearwardly and being positioned at a location in which no more than one of said red reflectors is optically blocked by the child during propulsion of said scooter, at least one white reflector secured to the front of said cab and facing generally forward, a battery-powered illuminating lamp secured to and positioned above the top of said cab, and at least one battery connected to said illuminating lamp and seated on one of said storage compartments adjacent one of said rearward upright abutment plates.

12. A foot-propelled scooter in accordance with claim 11 wherein said brake means includes a foot brake assembly comprising:

a flexible metal plate pivotally hinged to the underside of the second footboard and being movable from an upward position, generally parallel to said second footboard, to a downward braking position generally spaced below said second footboard, said flexible metal plate being of a length greater than the maximum height of said wheel means and having an arcuate configuration bowing generally downwardly in said downward braking position;

an elastomeric member secured to the end of said flexible metal plate and having a contact surface with a relatively high coefficient of friction for frictionally engaging the pavement in response to bowing of said flexible plate during braking;

a substantially rigid rod extending upward at an acute angle from said flexible plate to a height above said second footboard and being of a length greater than the height of said wheel means;

said second footboard defining an aperture for slidably receiving said rigid rod;

a stationary button-like foot pedal fixedly secured to the top of said rigid rod at a position above said second footboard; and first spring means operatively coupled to said rigid rod and extending above said second footboard for normally urging said flexible metal plate to said upward position substantially adjacent the underside of said second footboard.

13. A foot-propelled scooter in accordance with claim 11 wherein said brake means includes a hand brake assembly comprising:

a pivotable frame having at least one upwardly extending forearm section and an inclined handle section extending generally towards said cab, said pivotable frame including a pair of legs extending downwardly from and substantially aligned with said forearm section;

means pivotally connecting said legs to said rearward footboard;

a substantially non-rotatable cylindrical roller secured to and extending between said legs and disposed beneath said rearward footboard, said non-rotatable cylindrical roller having a generally smooth outer surface and being of a rubber-like material having a relatively high coefficient of friction for frictionally engaging the pavement during braking, and means fixedly securing said cylindrical roller to said legs for substantially preventing said cylindrical roller from rotating.

* * * * *

UNITED STATES PATENT AND TRADEMARK OFFICE
CERTIFICATE OF CORRECTION

PATENT NO. : 4,145,065
DATED : March 20, 1979
INVENTOR(S) : Rudolph J. Kupka

It is certified that error appears in the above-identified patent and that said Letters Patent are hereby corrected as shown below:

Column 3, line 31, "desirably" should be --desirable--.

Column 3, line 36, delete one "footboard".

Column 3, line 60, "footward" should be --footboard--.

Signed and Sealed this

Sixteenth Day of October 1979

[SEAL]

Attest:

RUTH C. MASON
Attesting Officer

LUTRELLE F. PARKER
Acting Commissioner of Patents and Trademarks